US006969002B2

(12) United States Patent
Creamer et al.

(10) Patent No.: US 6,969,002 B2
(45) Date of Patent: Nov. 29, 2005

(54) PROVIDING EXTENDED BAR CODE INFORMATION VIA LIQUID CRYSTAL DISPLAYS

(75) Inventors: Thomas E. Creamer, Boca Raton, FL (US); Victor S. Moore, Boynton Beach, FL (US); Wendi L. Nusbickel, Boca Raton, FL (US); Scott L. Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/324,651

(22) Filed: Dec. 19, 2002

(65) Prior Publication Data

US 2004/0118923 A1 Jun. 24, 2004

(51) Int. Cl.[7] .............................................. G06F 17/00
(52) U.S. Cl. ............................. 235/462.15; 235/462.01
(58) Field of Search ..................... 235/462.07, 462.09, 235/462.1, 462.14, 462.15, 462.17, 462.2, 235/462.22, 462.23, 462.24, 462.25, 462.32

(56) References Cited

U.S. PATENT DOCUMENTS

| | | | | |
|---|---|---|---|---|
| 5,414,251 A | * | 5/1995 | Durbin .................... 235/462.2 |
| 5,450,491 A | * | 9/1995 | McNair ....................... 713/184 |
| 5,535,118 A | * | 7/1996 | Chumbley ................... 235/375 |
| 5,979,757 A | * | 11/1999 | Tracy et al. ................. 235/383 |
| 6,027,024 A | | 2/2000 | Knowles ................. 235/472.01 |
| 6,177,683 B1 | | 1/2001 | Kolesar et al. .............. 250/566 |
| 6,193,161 B1 | | 2/2001 | Sojka et al. ............ 235/472.01 |
| 6,230,970 B1 | | 5/2001 | Walsh et al. ................. 235/379 |
| 6,345,764 B1 | | 2/2002 | Knowles ................. 235/472.01 |
| 6,429,776 B1 | * | 8/2002 | Alicot et al. .............. 340/572.1 |
| 6,685,093 B2 | * | 2/2004 | Challa et al. ........... 235/462.46 |
| 2001/0034717 A1 | | 10/2001 | Whitworth .................... 705/64 |
| 2001/0044324 A1 | | 11/2001 | Carayiannis et al. ........ 455/564 |
| 2001/0051915 A1 | | 12/2001 | Ueno et al. .................... 705/39 |

FOREIGN PATENT DOCUMENTS

| | | | |
|---|---|---|---|
| GB | 2293475 | 3/1996 | ............ G06K 7/14 |
| JP | 03122781 A * | 5/1991 | .......... G06K 07/10 |
| JP | 7195752 | 8/1995 | ............. B41J 5/30 |
| JP | 2001-325468 | 11/2001 | ........... G06F 17/60 |
| WO | WO83/00251 | 1/1983 | ............ G09G 3/00 |

OTHER PUBLICATIONS

P. Agrawal, et al., *A Testbed for Mobile Networked Computing, Communications —Gateway to Globalization; 1995 IEEE Int'l Conf on Communications, Seattle*, vol. 1, pp. 410-416, (1995).

L. Asböck, *New Ideas With New Computers: The Epson Handy Terminals, Mikro-und Kleincomputer*, vol. 9, No. 6, pp. 17-20, (Dec. 1987).

M. Anger, *TRS 80 Model 100: A "New Look" Portable, Micro Systemes*, Issue 37, pp. 86-91, (Dec. 1983).

(Continued)

*Primary Examiner*—Diane I. Lee
*Assistant Examiner*—Kumiko C. Koyama
(74) *Attorney, Agent, or Firm*—Akerman Senterfitt

(57) ABSTRACT

A method of automatically providing information from a portable computing device to a bar code reader can include, within the portable computing device, automatically detecting a scan from the bar code reader. Responsive to the automatic detection of the scan, one or more segments of a visual image can be presented on a display screen of the portable computing device.

23 Claims, 3 Drawing Sheets

OTHER PUBLICATIONS

B. D. Raunch, *Wearable Computers*, <http://eies.njit.edu/~turoff/coursenotes/CIS732/samplepro/brian_732.htm>, (Dec. 16, 1999).

J. Rekimoto, et al., *The World Through The Computer: Computer Augmented Interaction With Real World Environments*, UIST '95, pp. 29-36, (Nov. 14-17, 1995).

R. Kumar, *Internet Appliance Solutions: The Pocket Partner, Accelent Systems, Inc.*, (2001).

K. Matsumoto, et al., *Area Control System Via Bar Code ($2^{nd}$ Dimension) Displayed on Cellular or Other Mobile Terminal (Like Workpad)*, IBM Technical Data Bulletin, No. 454, Art. 126, pp. 294, (Feb. 2002).

* cited by examiner

PROVIDING EXTENDED BAR CODE INFORMATION VIA LIQUID CRYSTAL DISPLAYS

BACKGROUND OF THE INVENTION

1. Technical Field

The invention relates to the field of portable computing devices and, more particularly, to using portable computing devices to exchange information using bar codes.

2. Description of the Related Art

Bar codes are used to represent information in a manner that can be easily and automatically read by machines referred to as bar code readers. Accordingly, bar codes are utilized for a variety of different purposes which range from tracking and identifying inventory items to identifying persons. Bar codes can be implemented as single dimension bar codes or as multidimensional bar codes.

In any case, bar code readers, whether implemented as laser scanners, charge-coupled device (CCD) array scanners, or wand scanners, can read a bar code printed on a label. Generally, the bar code reader is able to read the bar code by passing a beam of light over the bar code. The scanner can determine the bars and the spaces between the bars based upon how much light is reflected from the bar code. Notably, bar code readers can scan a given target bar code anywhere from one time per second to over hundreds of times per second. Once the bar code has been read, the bar code scanner can process the raw data.

Bar codes need not be printed on paper or other conventional surfaces. For example, bar codes can be displayed upon display devices such as liquid crystal displays (LCD). LCDs operate by altering the polarity of portions of the screen to allow light to pass through thereby producing areas of contrast on the LCD. Thus, a bar code can be displayed upon the LCD and can be read by a bar code reader.

Conventional devices such as electronic wallets having displays incorporated therein can be programmed to display bar codes upon the display screen of the device. These devices can be programmed to store and display any of several different bar codes which correspond to identification cards the user typically carries on his or her person. Because the electronic wallet can display a given bar code responsive to a user request, the user need not carry the various individual cards if the bar code from the card is stored within the electronic wallet.

Still, such devices are limited to displaying a single bar code responsive to a user request.

SUMMARY OF THE INVENTION

The present invention provides a method, system, and apparatus for conveying information from a portable computing device to a bar code reader. More particularly, the present invention can provide information to a bar code reader by sequentially displaying segments of a large or extended bar code. In addition to providing more information through a set of sequential bar code segments than would be possible using conventional bar code display technologies, the present invention can detect when a bar code reader is attempting to scan the display of the portable computing device so as to automatically begin displaying segments of the bar code. The segments can be displayed sequentially according to a predetermined time interval, or can be displayed each time the bar code reader scans the display of the portable computing device.

One aspect of the present invention can include a method of automatically providing information from a portable computing device to a bar code reader. The method can include, within the portable computing device, automatically detecting a scan from the bar code reader. For example, the light emanating from the bar code reader can be automatically detected. Responsive to the automatic detection of the scan, one or more segments of a visual image can be presented on a display screen of the portable computing device. For instance, several segments of an extended visual image can be presented sequentially or a segment which constitutes an entire visual image can be presented upon the display of the portable computing device.

Another embodiment of the present invention can include a method of providing information from a portable computing device to a bar code reader wherein segments of an extended visual image are presented responsive to scans by the bar code reader.

The method can include, within the portable computing device, detecting a first scan from the bar code reader and, responsive to the detection of the first scan, presenting on a display screen of the portable computing device a first segment of the visual image. Accordingly, a second scan can be detected from the bar code reader. Responsive to the detection of the second scan, a next segment of the visual image can be presented upon the display screen.

The method can include detecting further scans from the bar code reader and, for each detected further scan, presenting upon the display of the portable computing device a next segment of the visual image until each segment of the visual image has been displayed. Notably, the detecting steps can include detecting light emanating from the bar code reader.

Another embodiment of the present invention can include a method of providing information from a portable computing device to a bar code reader wherein responsive to a detected event, a first segment of a visual image can be presented on a display screen of the portable computing device. Prior to the step of presenting the first segment, the method can include detecting a user command and generating the event in response to the detected command. Alternatively, prior to the step of presenting the first segment, the method can include detecting a scan from the bar code reader and generating the event in response to the detected scan. In any case, the method can include sequentially presenting upon the display of the portable computing device, further segments of the visual image, wherein each further segment of the visual image is displayed for a predetermined amount of time.

Another aspect of the present invention can include a portable computing device for displaying visual images. The portable computing device can include a display which is capable of presenting one or more segments of a visual image to be read by a bar code reader, for example a liquid crystal display. The portable computing device also can include a sensor configured to detect a scan from the bar code reader and a processor configured to instruct the display to present the one or more segments of the visual image responsive receiving a signal from the sensor indicating that a scan from the bar code reader was detected. The portable computing device also can include a memory for storing the one or more segments of the visual image or other visual images.

The sensor can be configured to detect multiple scans by the bar code reader and provide a signal to the processor for each detected scan. Accordingly, the processor can be configured to send to the display a next segment of the visual image to be presented upon the display for each signal received from the sensor. Alternatively, the processor can be configured to send to the display further segments of the visual image to be presented upon the display, wherein each further segment is displayed for a predetermined amount of time.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The present invention provides a solution for conveying information from a portable computing device to a bar code reader. The present invention can provide information to a bar code reader by sequentially displaying segments of an extended bar code. The invention further can automatically display a complete bar code or segments of an extended bar code, whether single dimension or multidimensional bar codes, automatically responsive to detecting a scan from a bar code reader.

The term "bar code" as used herein, can include any of a variety of graphic symbols or visual images. The bar code can be formed from an ordering of spaced vertical bars, wherein both the thickness of the bars and the amount of space between the bars can vary. The arrangement of bars and spacing specifies encoded information. For example, the bar code can be a conventional low, medium, or high density bar code. The bar code, however, also can be a single dimension, dual dimension and/or multidimensional bar code. Still, the bar code need not be formed of bars and spaces at all, but rather any image which can be read or interpreted using a scanning device capable of detecting visually detectable patterns, referred to as a "bar code" reader or scanner. Although a variety of existing bar code encoding standards exist, a bar code can specify information, whether numbers, characters, and/or symbols, using any protocol which both the bar code reader, and decoder if separate from the bar code reader, and the bar code generating device have been configured or programmed to implement.

An extended bar, as used herein, can refer to a bar code that is longer than those in conventional use. Accordingly, an extended bar code can present more information than conventional paper-based bar codes. Thus, the extended bar codes can specify additional information such as parity bits for forward error correction, additional bits for encryption and authentication, or any other additional information which may be of use.

Figure 1:
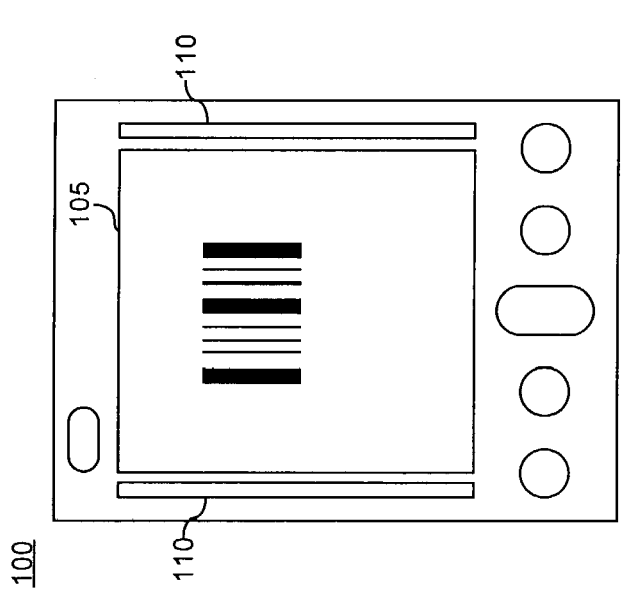
FIG. 1 is a schematic diagram illustrating a portable computing device in accordance with the present invention.

FIG. 1 is a schematic diagram illustrating a portable computing device 100 in accordance with the present invention. The portable computing device 100 can be implemented as any of a variety of different computing devices including, but not limited to, portable computers, laptop computers, palmtop computers, personal digital assistants, wireless telephones and/or cellular telephones. As shown, the portable computing device can include a display 105 and bar code reader scan sensors 110.

The display 105 can be a liquid crystal display (LCD) or any other display which can display or present a bar code that can be read by any of a variety of bar code readers, such as laser bar code readers, charge-coupled device (CCD) array bar code readers, or wand bar code readers. The bar code reader scan sensors (hereafter scan sensors) 110 can be configured to detect a light source from a bar code reader. Accordingly, the scan sensors 110 can be implemented in similar fashion to the detectors or sensors disposed within conventional bar code readers. The scan sensors 110 can be configured to detect light having a wavelength within a predetermined wavelength range which includes light sources utilized by bar code readers. Accordingly, the sensors 110 can be equipped with suitable filters for blocking unwanted light falling outside of the predetermined wavelength range, or light which does not fall within given predefined bands of allowable wavelengths.

Although the scan sensors 110 are shown in FIG. 1 as being located on either side of the display 105, it should be appreciated that the scan sensors 110 can be disposed in a variety of positions in and around the display 105. For example, the scan sensors 110 can be disposed above, below, or above and below the display 105. Further, although two scan sensors 110 are shown, the present invention can be implemented with a single scan sensor 110. Accordingly, the particular scan sensor 110 configuration used by the portable computing device 100 can vary with the type of bar code reader device which is intended to read the display 105. Thus, as the scan sensor 110 configuration and layout in the portable computing device 100 can vary according to the dispersal pattern of the light emanating from the bar code reader light source, the scan sensors 110 can be implemented in a variety of shapes and configurations which need not run the length of the display screen 105 as shown.

Figure 2:
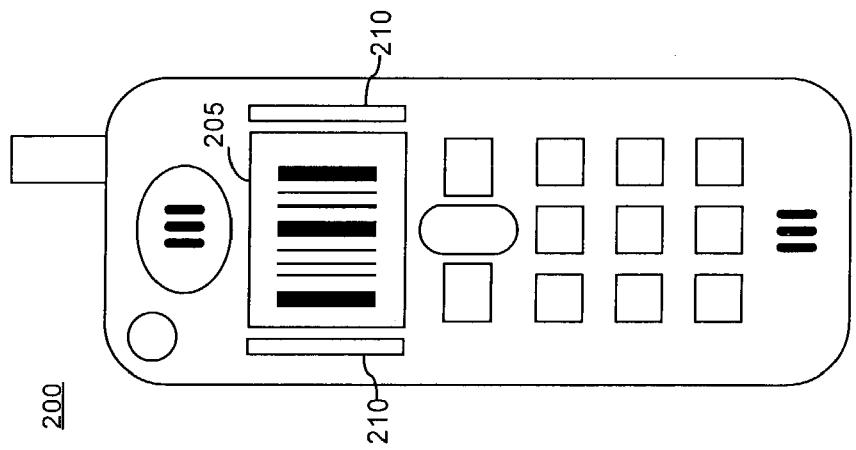
FIG. 2 is a schematic diagram illustrating another portable computing device in accordance with the present invention.

FIG. 2 is a schematic diagram illustrating another portable computing device 200 in accordance with the present invention. The portable computing device 200 represents a cellular telephone configured in accordance with the inventive arrangements disclosed herein. The portable computing device 200, similar to the device of FIG. 1, includes a display 205, for example an LCD, as well as scan sensors 210 for detecting a light source from a bar code reader.

Figure 3:
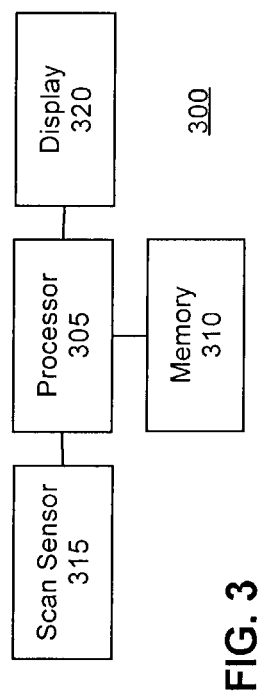
FIG. 3 is a schematic diagram illustrating an exemplary architecture for a computing device configured according to the present invention.

FIG. 3 is a schematic diagram illustrating an exemplary architecture for a computing device 300 configured according to the present invention. As shown, the computing device 300 can include a processor 305, a memory 310, a scan sensor 315, and a display 320. The portable computing device can include a power source (not shown) such as a battery, whether disposable or rechargeable, and/or means by which the portable computing device can be plugged into an exterior power source such as a wall socket or other receptacle such as a cigarette lighter. As noted, a bar code reader can perform multiple scans each second. The bar code reader can be activated by a user or can be configured to continually scan for a target whether such a target is in scanning range or not. That is, the bar code reader can continually pulse a light source into the scanning area. When a target does come into the scanning area, the data received by the bar code reader can be interpreted to determine whether the data represents a valid bar code.

In operation, when brought into the scanning range of the light source of the bar code reader, the scan sensor 315 can detect the beam of light which emanates from the bar code reader. The scan sensor 315 can detect each pulse of the light source of the bar code reader as the light source continually attempts to read any targets within the scanning area. For each detected pulse of the light source from the bar code reader, the scan sensor 315 can send a signal to the processor 305. The processor 305 can access the memory 310 to retrieve bar code information from the memory 310.

In one embodiment, the processor 305 can retrieve an entire bar code which can be provided to the display 320 for presentation. In another embodiment, a first segment of an extended bar code can be retrieved from the memory 310 and provided to the display 320 for presentation. In that case, the processor 305 can retrieve another segment of the extended bar code each time a signal from the scan sensor 315 is received. Each of the retrieved segments can be provided to the display 320 for presentation. Notably, the processor can continue to retrieve additional segments of the extended bar code until either no segments of the extended bar code remain, that is each has been presented upon the display 320, or no further signals are received from the scan sensor 315 indicating that the portable computing device 300 is out of scanning range of the bar code reader or that the bar code reader has stopped scanning.

According to another aspect of the present invention, the scan sensors 315, upon detecting a light source from the bar code reader, can send a signal to the processor 305. The processor 305 can retrieve a first segment of an extended bar code. In this embodiment, rather than presenting further segments of the extended bar code for each subsequent detection of a light pulse from the light source of the bar code reader, further segments of the extended bar code can be automatically played, for example at predetermined intervals.

The bar code reader can read a segment of the extended bar code one or more times for each scan or pulse of the light source. A computing device attached to the bar code reader or incorporated within the bar code reader can include necessary logic for determining whether a same segment was read in subsequent reads of the bar code scanner or that different segments were read. Such an embodiment can be implemented regardless of the scan rate of the bar code reader. Further such an embodiment can be implemented in cases where a bar code reader does not pulse the light source, but rather utilizes a light source which is constant.

Figure 4:
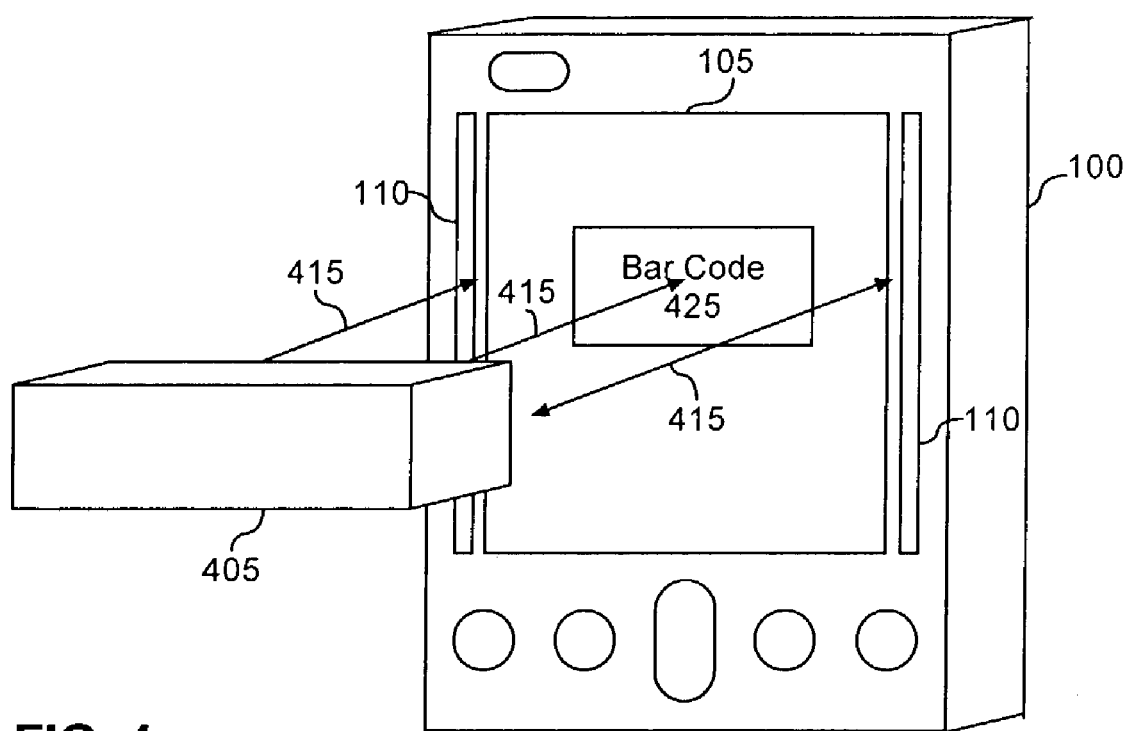
FIG. 4 is a schematic diagram illustrating operational aspects of the portable computing device of FIG. 1.

FIG. 4 is a schematic diagram illustrating operational aspects of the portable computing device of FIG. 1. As shown in FIG. 4, a bar code reader 405 begins a first scan of the portable computing device 100. Accordingly, the bar code reader emits a first pulse of light 415 having a given wavelength. The scan sensors 110, being tuned to detect light having a wavelength falling within a range of wavelengths selected to include light sources of bar code readers, can detect the pulse of light 415. Accordingly, the portable computing device can display a first segment of an extended bar code 425 upon display 105.

Figure 5:
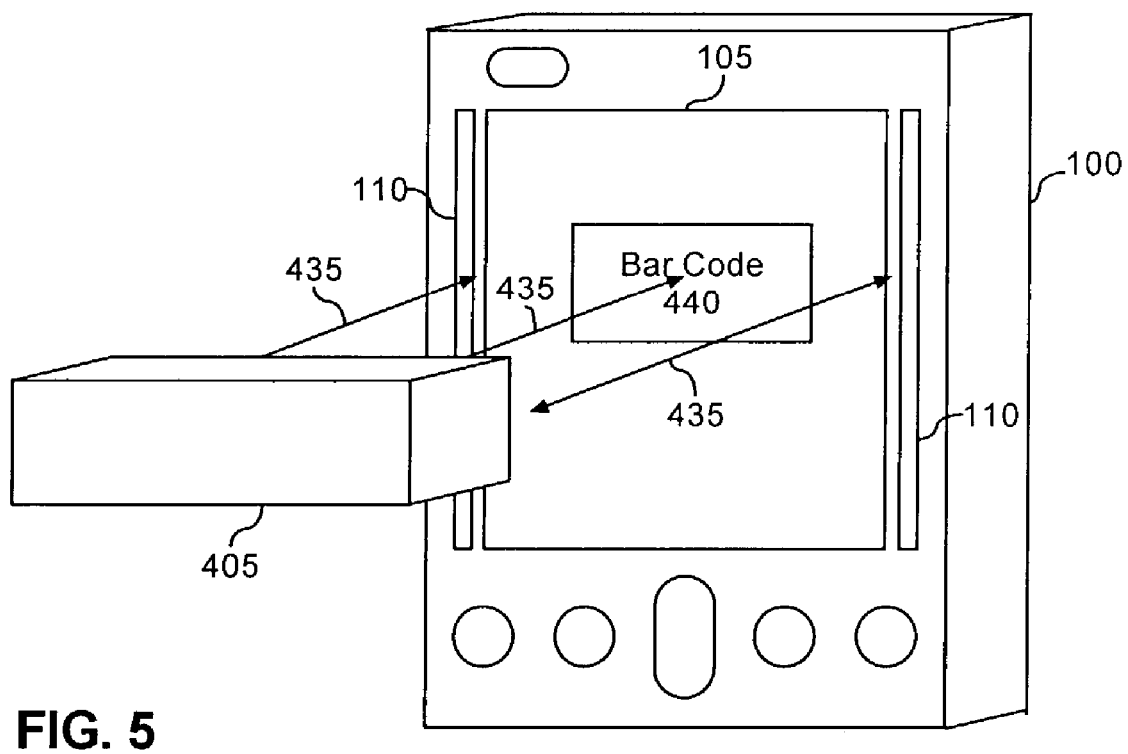
FIG. 5 is a schematic diagram illustrating further operational aspects of the portable computing device of FIG. 1.

FIG. 5 is a schematic diagram illustrating further operational aspects of the portable computing device of FIG. 1. More particularly, FIG. 5 illustrates the portable computing device 100 of FIG. 1 in the process of detecting a second or subsequent scan from the bar code reader 405. As shown, the bar code reader 405 has initiated a second pulse of the light source, and emanates a second light beam 435. Responsive to detection of the second light pulse by the scan sensors 110, the portable computing device 100 can display a next segment 440 of the extended bar code. In this manner, multiple segments of the extended bar code can be displayed sequentially upon the display 105 of the portable computing device. Accordingly, significantly more information can be provided than would otherwise be possible when displaying only a single bar code.

Still, as noted, other embodiments of the present invention can include displaying each segment of an extended bar code in sequential fashion, wherein each segment is displayed for a predetermined time period before presenting the next segment. According to this embodiment, the sequence of bar code segments can be initiated by detection of a scan by the scan sensor 110, or by a user command, for example a voice command, a key command, or the like.

Figure 6:
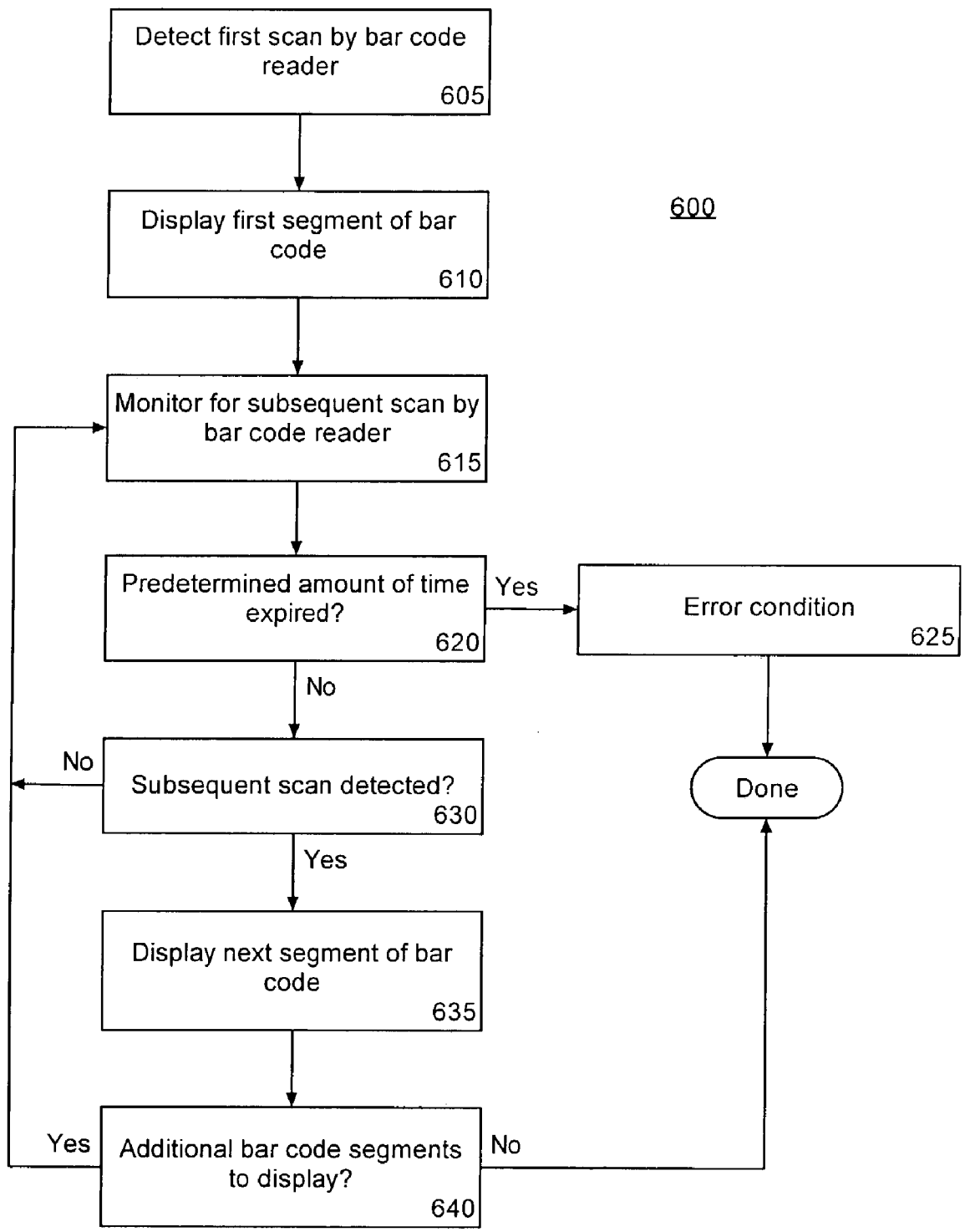
FIG. 6 is a flow chart illustrating a method of conveying information through a portable computing device by presenting segments of an extended bar code.

FIG. 6 is a flow chart illustrating a method 600 of conveying information through a portable computing device by presenting segments of a bar code. The method can begin in a state wherein a portable computing device has been programmed to detect pulses of light within a predetermined wavelength range. The portable computing device can be positioned within the scanning area of a bar code scanner and can be powered on or operate in a standby state such that the scan detectors are active. Accordingly, in step 605, the scan sensors of the portable computing device can detect a first scan or light pulse from the bar code reader.

In step 610, responsive to detection of the scan by the bar code reader, a first segment of an extended bar code can be displayed upon the display screen of the portable computing device. In step 615, the portable computing device can monitor for subsequent scans by the computing device. That is, the processor can continually monitor for signals or interrupts received from the scan sensors indicating that another scan has been detected.

In step 620, a determination can be made as to whether more than a predetermined amount of time has elapsed since detecting the last scan from the bar code reader. If more than the predetermined amount of time has elapsed, the method can proceed to step 625 indicating an error condition. In step 625, the portable computing device can indicate the error condition by playing an audible notification, displaying a notification, or performing another error recovery technique. For example, although alternative error recovery techniques are not disclosed within the flow chart, those skilled in the art will recognize that one or more error recovery techniques can be implemented such as beginning the presentation of segments of the bar code anew, terminating the presentation of bar code segments, and the like. Accordingly, after step 625, the method can end.

If in step 620, the predetermined time period for monitoring for subsequent scans of the bar code has not elapsed, the method can continue to step 630. In step 630, a determination can be made as to whether a subsequent scan has been detected. If not, the method can loop back to step 615 to continue monitoring for a subsequent bar code reader scan. If a subsequent scan by the bar code reader is detected, the method can continue to step 635. In step 635, the next segment of the bar code can be presented upon the display of the portable computing device. The method then can proceed to step 640, where a determination can be made as to whether additional segments of the bar code have yet to be displayed. If not, the method can end. If so, the method can continue to step 615 to continue monitoring for subsequent scans by the bar code reader.

The present invention provides a method, system, and apparatus for providing information from a portable computing device to another computer system through a bar code reader. The inventive arrangements disclosed herein enable a portable computing device to automatically detect a scan by a bar code reader, and in response, present one or more bar codes or bar code segments. The segments of an extended bar code can be presented sequentially for predetermined periods of time or can be presented sequentially responsive to the detection of subsequent scans by the bar code reader. Irrespective of the particular embodiment, substantial amounts of information can be transferred from the portable computing device through the bar code reader.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program or application in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of providing information from a portable computing device to a bar code reader comprising:
   within the portable computing device comprising at least one processor, at least one display screen, and a scan sensor, said scan sensor detecting a scan from the remotely located bar code reader, wherein the bar code reader is distinct from the portable computing device such that the bar code reader scans the display screen of the portable computing device, wherein pulses of light used to scan a bar code presented upon the display screen are generated by the bar code reader;
   responsive to said detecting step, presenting on the display screen of the portable computing device, at least one segment of a visual image to be read by the bar code reader, wherein the bar code reader interprets data received responsive to scanning the display screen.

2. The method of claim 1, said detecting step further comprising automatically detecting light emanating from the bar code reader.

3. The method of claim 1, wherein said at least one segment comprises an entirety of the visual image.

4. A method of providing information from a portable computing device to a remotely located bar code reader comprising:
   within the portable computing device comprising at least one processor, at least one display screen, and a scan sensor;
   wherein pulses of light used to scan a bar code presented upon the display screen are generated by the bar code reader;
   the scan sensor detecting a first scan from the remotely located bar code reader, wherein the bar code reader is distinct from the portable computing device such that the bar code reader scans a display screen of the portable computing device;
   responsive to said step of detecting the first scan, presenting on the display screen of the portable computing device a first segment of a visual image to be read by the bar code reader, wherein the bar code reader interprets data received responsive to scanning the first segment and subsequently generates a second scan;
   the scan sensor detecting the second scan from the bar code reader; and
   responsive to said step of detecting the second scan, presenting on the display screen a next segment of the visual image to be read by the bar code reader, wherein the bar code reader interprets data received responsive to scanning the second segment.

5. The method of claim 4, further comprising:
   detecting further scans from the bar code reader; and
   for each detected further scan, presenting upon the display of the portable computing device a next segment of the visual image to be read by the bar code reader until each segment of the visual image has been displayed.

6. The method of claim 4, wherein each said detecting step comprises detecting light emanating from the bar code reader.

7. A method of providing information from a portable computing device to a remotely located bar code reader comprising:
   identifying a portable computing device comprising at least one processor, at least one display screen, and a scan sensor;
   wherein pulses of light used to scan a bar code presented upon the display screen are generated by the bar code reader;
   the scan sensor responsive to an event detected by the scan sensor, presenting on the display screen of the portable computing device a first segment of the visual image to be read by the remotely located bar code reader, wherein the bar code reader is distinct from the portable computing device, wherein the remotely located bar code reader interprets data received responsive to scanning the first segment; and
   sequentially presenting upon the display of the portable computing device, further segments of the visual image to be read by the bar code reader, wherein each further segment of the visual image is displayed for a predetermined amount of time, wherein the remotely located bar code reader interprets data received responsive to scanning the subsequently presented segments of the visual image.

8. The method of claim 7, wherein prior to said step of presenting the first segment, said method further comprises:
   detecting a user command; and
   generating the event in response to the detected command.

9. The method of claim 7, wherein prior to said step of presenting the first segment, said method further comprises:
   detecting a scan from the bar code reader; and
   generating the event in response to the detected scan.

10. A portable computing device for displaying visual images comprising:
   a display which presents at least one segment of a visual image to be read by a remotely located bar code reader, wherein the remotely located bar code reader is distinct from the portable computing device, such that the bar code reader scans the display of the portable computing device;
   at least one sensor configured to detect a scan from the bar code reader, wherein said at least one sensor is located on a same face of said portable computing device as said display; and
   a processor configured to instruct said display to present the at least one segment of the visual image responsive receiving a signal from said sensor indicating that a scan from the bar code reader was detected, wherein pulses of light used to scan a bar code presented upon the display screen are generated by the bar code reader, and wherein the remotely located bar code reader interprets data received responsive to scanning the display upon which the at least one segment of the visual image is presented.

11. The portable computing device of claim 10, further comprising:
   a memory for storing a plurality of segments of the visual image.

12. The portable computing device of claim 11, wherein said sensor is configured to detect multiple scans by the bar code reader and provide a signal to said processor for each detected scan, and wherein said processor is configured to send to said display a next segment of the visual image to be presented upon the display for each signal received from the sensor.

13. The portable computing device of claim 11, wherein said processor is configured to send to said display further segments of the visual image to be presented upon the display, wherein each further segment is displayed for a predetermined amount of time.

14. The portable computing device of claim 10, wherein said display is a liquid crystal display.

15. A machine readable storage, having stored thereon a computer program having a plurality of code sections executable by a machine for causing the machine to perform the steps of:
   within a portable computing device comprising at least one processor, at least one display screen, and a scan sensor, said scan sensor detecting a scan from the remotely located bar code reader, wherein the bar code reader is distinct from the portable computing device such that the bar code reader scans the display screen of the portable computing device, wherein pulses of light used to scan a bar code presented upon the display screen are generated by the bar code reader;
   responsive to said detecting step, presenting on the display screen of the portable computing device, at least one segment of the visual image to be read by the bar code reader, wherein the bar code reader interprets data received responsive to scanning the display screen.

16. The machine readable storage of claim 15, said detecting step further comprising automatically detecting light emanating from the bar code reader.

17. The machine readable storage of claim 15, wherein said at least one segment comprises an entirety of the visual image.

18. A machine readable storage, having stored thereon a computer program having a plurality of code sections executable by a machine for causing the machine to perform the steps of:
   within a portable computing device comprising at least one processor, at least one display screen, and a scan sensor, said scan sensor detecting a first scan from a remotely located bar code reader, wherein the bar code reader is distinct from the portable computing device such that the bar code reader scans display screen of the portable computing device;
   wherein pulses of light used to scan a bar code presented upon the display screen are generated by the bar code reader;
   responsive to said step of detecting the first scan, presenting on the display screen of the portable computer device a first segment of a visual image to be read by the bar code reader, wherein the bar code reader interprets data received responsive to scanning the first segment and subsequently generates a second scan;
   the scan sensor detecting the second scan from the bar code reader; and
   responsive to said step of detecting the second scan, presenting on the display screen a next segment of the visual image to be read by the bar code reader, wherein the bar code reader interprets data received responsive to scanning the second segment.

19. The machine readable storage of claim 18, further comprising:
   detecting further scans from the bar code reader, and
   for each detected further scan, presenting upon the display of the portable computing device a next segment of the visual image to be read by the bar code reader until each segment of the visual image has been displayed.

20. The machine readable storage of claim 18, wherein each said detecting step comprises detecting light emanating from the bar code reader.

21. A machine readable storage, having stored thereon a computer program having a plurality of code sections executable by a machine for causing the machine to perform the steps of:
   identifying a portable computing device comprising at least one processor, at least one display screen, and a scan sensor;
   wherein pulses of light used to scan a bar code presented upon the display screen are generated by the bar code reader;
   the scan sensor responsive to an event detected by the scan sensor, presenting on the display screen of the portable computing device a first segment of the visual image to be read by the remotely located bar code reader, wherein the bar code reader is distinct from the portable computing device, wherein the remotely located bar code reader interprets data received responsive to scanning the first segment; and
   sequentially presenting upon the display of the portable computing device, further segments of the visual image to be read by the bar code reader, wherein each further segment of the visual image displayed for a predetermined amount of time, wherein the remotely located bar code reader interprets data received responsive to scanning the subsequently presented segments of the visual image.

22. The machine readable storage of clam, 21, wherein prior to said step of presenting the first segment, said method further comprises:
   detecting a user command; and
   generating the event in response to the detected command.

23. The machine readable storage of claim 21, wherein prior to said step of presenting the first segment, said method further comprising:
   detecting a scan from the bar code reader; and
   generating the event in response to the detected scan.

* * * * *